Patented Oct. 6, 1953

UNITED STATES PATENT OFFICE 2,654,785

QUATERNATED AZA-PENTANE AMINES

Karl Miescher, Riehen, and Adrian Marxer, Basel, Switzerland, assignors to Ciba Pharmaceutical Products, Inc., Summit, N. J.

No Drawing. Application February 6, 1950, Serial No. 142,712. In Switzerland February 15, 1949

7 Claims. (Cl. 260—567.6)

The present invention relates to new and useful chemical compounds.

More especially, the invention relates to wholly or partially quaternated azalkane diamines of the formula

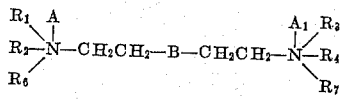

in which B represents the radical of the formula

or

and $R_1$–$R_8$ each represent alkyl or alkenyl radicals containing 1–3 carbon atoms, and A–$A_2$ each represent anions such as halogen atoms, the radical of an alkyl-sulfuric acid such as methyl-sulfuric acid or an alkyl or aryl sulfonic acid or a hydroxyl group.

These new compounds possess specific actions on the important regulating mechanisms of the autonomic and central nervous systems through their ganglionic blocking effect. Especially valuable are compounds of the formula shown above wherein at least $R_1$ to $R_5$ represent methyl groups, primarily N,N,N',N',3-pentamethyl-N,N'-diethyl - 3 - aza - pentane- and N,N,N,N',N',N',3-heptamethyl - 3 - aza - pentane - 1,5 - diammonium compounds, particularly the N,N,N',N',3-pentamethyl - N,N'- diethyl - 3 - aza - pentane-1,5-diammonium-dibromide of the formula

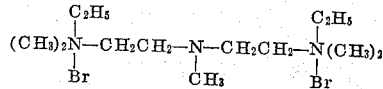

and the N,N,N,N',N',N',3-heptamethyl-3-aza-pentane-1,5-diammonium-diiodide of the formula

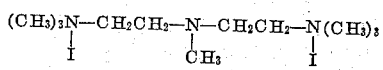

They can be used as medicaments.

The aforesaid quaternary ammonium compounds may be prepared by various methods. Thus, for example, they are obtained by treating an azalkane diamine of the formula

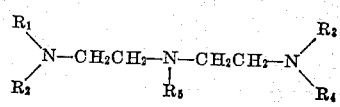

or a partially quaternated derivative thereof with a quaternating agent which is capable of introducing an alkyl or alkenyl radical containing 1–3 carbon atoms. As quaternating agents there may be used, for example, alkyl or alkenyl halides such as methyl chloride, methyl bromide or methyl iodide, and also dialkyl sulfates such as dimethyl sulfate or diethyl sulfate, or alkyl-, or aryl-sulfonic acid esters such as para-toluene sulfonic acid methyl ester. The reaction is advantageously carried out in the presence of solvents such as alcohol or acetone. It is surprising that the aforesaid amines can be quaternated in stages, so that under mild conditions the quaternation discontinues after two nitrogen atoms have been saturated. The diquaternary compound so obtained can be converted by more energetic treatments into the triquaternary compound.

The starting materials used in this process may be obtained in a manner analogous to the known processes of manufacture of alkylated amines.

The following examples illustrate the invention, the parts being by weight unless otherwise stated, and the relationship of parts by weight to parts by volume being the same as that of the gram to the cubic centimeter:

Example 1

34.7 parts of N,N,N',N',3-pentamethyl-3-azapentane-1,5-diamine are dissolved in 150 parts by volume of absolute alcohol. 71.0 parts of methyl iodide dissolved in 50 parts by volume of absolute alcohol are gradually added while stirring. By occasionally cooling with water the temperature is maintained at 40° C. When the addition is complete the whole is stirred for a further 4 hours in a water bath having a temperature of 90° C. The crystals which precipitate copiously are then separated by filtering with suction, washed with alcohol, dissolved for the purpose of recrystallization in a small quantity of aqueous alcohol, and precipitated by means of absolute alcohol. The resulting N,N,N,N',N',N',3-heptamethyl - 3 - aza - pentane - 1,5 - diammonium-diiodide of the formula

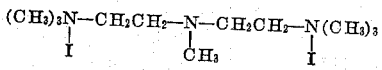

melts at 227–229° C.

By treating the above compound with the equivalent quantity of silver hydroxide there is obtained N,N,N,N',N',N',3 - heptamethyl - 3 - aza-pentane-1,5-diammonium hydroxide.

Example 2

7.6 parts of N,N,N,N',N',N',3-heptamethyl-3-aza-pentane-1,5-diammonium-diiodide and 7.1 parts of methyl iodide in 75 parts by volume of absolute alcohol are heated for 6 hours in a tube at 140° C. The brownish crystals are separated by filtration, and dissolved in water, and the aqueous solution is filtered and evaporated under reduced pressure. The residue is dissolved in a small quantity of aqueous alcohol and by means of absolute alcohol N,N,N,N',N',N',3,3-octamethyl-3-azonium-pentane-1,5-diammonium-triiodide melting at 168–170° C. is precipitated. It has the formula

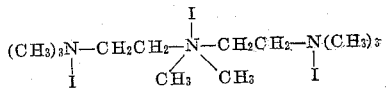

The later compound can also be obtained directly from N,N,N',N',3-pentamethyl-3-aza-pentane-1,5-diamine and an excess of methyl iodide under the conditions described above.

By treating the above compound with one equivalent of silver hydroxide there is obtained N,N,N,N',N',N',3,3 - octamethyl - 3 - azonium-pentane-1,5-diammonium diiodide-3-hydroxide.

Example 3

34.7 parts of N,N,N',N',3-pentamethyl-3-aza-pentane-1,5-diamine and 47.9 parts of ethyl bromide are heated in 200 parts by volume of absolute alcohol for 30 minutes at 50° C. and then heated for 4 hours at the boil. The alcoholic solution is concentrated under reduced pressure to a small volume, whereby crystallization takes place. It is then recrystallized from alcohol with the addition of ethyl acetate, and the pure N,N,N',N',3 - pentamethyl - N,N', - diethyl - 3 - aza-pentane-1,5-diammonium-dibromide so obtained has the formula $$(CH_3)_2\overset{C_2H_5}{\underset{Br}{N}}-CH_2CH_2-\underset{CH_3}{N}-CH_2CH_2-\overset{C_2H_5}{\underset{Br}{N}}(CH_3)_2$$

and melts at 213–215° C.

Example 4

22.9 parts of 3-methyl-N,N,N',N'-tetraethyl-3-aza-pentane-1,5-diamine and 54.5 parts of ethyl bromide are heated together with 50 parts by volume of absolute alcohol for 6 hours in a tube at 100° C. The reaction product is taken up in alcohol, and the ammonium salt is precipitated with ether and purified by dissolving it in alcohol and precipitating it with ether. By powerful drying there is obtained hygroscopic 3 - methyl - N,N,N,N',N',N',3 - heptaethyl - 3 - azonium-pentane-1,5-diammonium-tribromide of the formula $$(C_2H_5)_3\overset{Br}{N}-CH_2CH_2-\underset{CH_3}{\overset{Br}{N}}-CH_2CH_2-\overset{}{\underset{CH_3}{N}}-CH_2CH_2-\overset{}{N}(C_2H_5)_3$$

Example 5

17.3 parts of N,N,N',N',3-pentamethyl-3-aza-pentane-1,5-diamine in 75 parts by volume of absolute alcohol are gradually mixed with 25.2 parts of dimethyl-sulfate in 25 parts by volume of absolute alcohol and the whole is then heated for 3 hours in a reflux apparatus. The whole is evaporated to dryness, and the residue is dissolved in alcohol and reprecipitated by the addition of ethyl acetate. In this manner there is obtained N,N,N,N',N',N'-3-heptamethyl-3-azapentane-1,5-diammonium-dimethosulfate of the formula

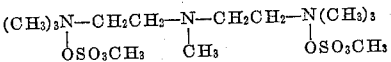

The compound forms extremely deliquescent crystals, the melting point of which varies according to the water content; in a certain form they melt at 85–87° C.

Example 6

34.6 parts of N,N,N',N',3-pentamethyl-3-aza-pentane-1,5-diamine are dissolved in 150 parts by volume of acetic ester and admixed to 48.4 parts of allylbromide in 50 parts by volume of acetic ester. The temperature is slowly raised and the reaction mass then boiled under reflux for 4 hours. The solvent is decanted from the quaternary oil and the latter agitated twice with ether whereupon it gradually solidifies in the form of crystals. The N,N,N',N',3-pentamethyl-N,N'-diallyl-3-aza-pentane-1,5-diammonium-dibromide thus obtained has the formula

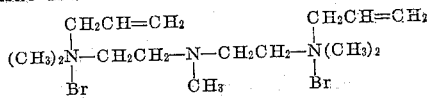

and melts at 176–179° C.

Example 7

22.9 parts of 3-methyl-N,N,N',N'-tetraethyl-3-aza-pentane-1,5-diamine in 100 parts by volume of alcohol are treated with 24.0 parts of ethylbromide in 30 parts by volume of alcohol, allowed to stand for several hours at room temperature, and then refluxed for 4 hours. After highly concentrating the mixture by evaporation, admixing with acetic ester, and recrystallization of the precipitated product from a mixture of alcohol, acetic ester, and ether, 3-methyl-N,N,N,N',N',N'-hexaethyl-3-aza-pentane-1,5-diammonium-dibromide is obtained in the form of hygroscopic crystals, melting at 194° C. (sintering from 189° C. upwards).

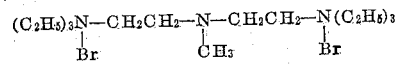

Example 8

34.7 parts of N,N,N',N',3-pentamethyl-3-aza-pentane-1,5-diamine in 150 parts by volume of alcohol are cooled in a tube with ice and sodium chloride. 32.3 parts of ethylchloride are then added and the mass heated to 90° C. After cooling, the mass is concentrated by evaporation under reduced pressure, and the resultant N,N,N',N',3 - pentamethyl - N,N' - diethyl - 3 - aza - pentane - 1,5 - diammonium - dichloride of melting point 236° C. caused to crystallize by the addition of acetic ester.

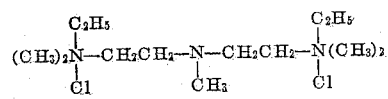

Example 9

34.7 parts of N,N,N',N',3-pentamethyl-3-aza-pentane-1,5-diamine in 100 parts by volume of absolute alcohol are cooled and then mixed with 57.0 parts of methyl bromide in 100 parts by volume of absolute alcohol. The crystallization which sets in after some time evolves heat, so that cooling has to be repeated temporarily. Stirring for a rather long time at room temperature is followed by suction filtering and washing with alcohol. The resultant N,N,N,N',N',N',3-heptamethyl - 3 - aza - pentane - 1,5 - diammo-nium-dibromide of the formula

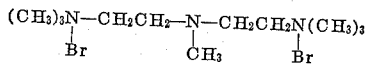

melts at 233–235° C.

The triamines used as starting materials in these examples may be produced as follows:

The N,N,N',N',3 - pentamethyl - 3 - aza - pentane-1,5-diamine is obtained by methylating the 3-aza-pentane-1,5-diamine by means of an aqueous solution of formaldehyde and formic acid.

By treating bis-(β-chlorethyl)-amine with diethylamine and methylating the resulting N,N,N',N', - tetraethyl - 3 - aza - pentane - 1,5 - diamine with an aqueous solution of formaldehyde and formic acid, there is obtained the 3 - methyl - N,N,N',N' - tetraethyl - 3 - aza - pentane - 1,5 - diamine.

Having thus disclosed the invention what is claimed is:

1. A quaternated ammonium compound which corresponds to the formula

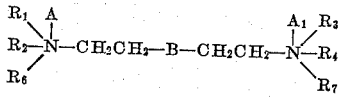

wherein —B— stands for a member selected from the group consisting of

and

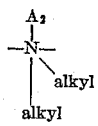

each of $R_1$, $R_2$, $R_3$ and $R_4$ stands for alkyl, and each of $R_6$ and $R_7$ stands for a member of the group consisting of alkyl and alkenyl, each alkyl and each alkenyl group containing 1 to 3 carbon atoms, and each of A, $A_1$ and $A_2$ representing a member selected from the group consisting of halogen, lower alkyl sulfuric and sulfonic and monocyclic aryl sulfonic anions, and hydroxyl.

2. A quaternated ammonium salt which corresponds to the formula

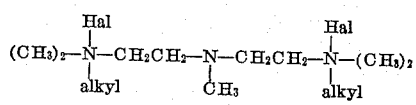

wherein each alkyl contains from 1 to 3 carbon atoms, and Hal represents a halogen atom.

3. N,N,N',N',3 - pentamethyl - N,N' - diethyl - 3 - aza - pentane - 1,5 - diammonium - dibromide of the formula

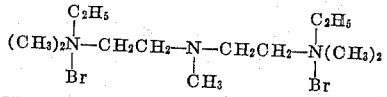

4. N,N,N,N',N',N',3 - heptamethyl - 3 - aza - pentane - 1,5 - diammonium - diiodide of the formula

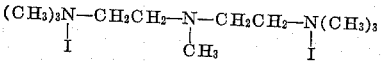

5. N,N,N,N',N',N',3,3 - octamethyl - 3 - azonium - pentane - 1,5 - diammonium - triiodide of the formula

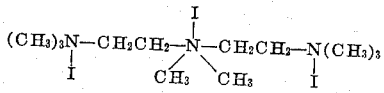

6. N,N,N',N',3 - pentamethyl - N,N'-diethyl - 3 - aza - pentane - 1,5 - diammonium - dichloride of the formula

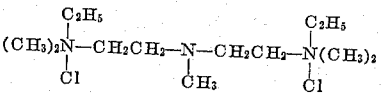

7. N,N,N,N',N',N',3 - heptamethyl - 3 - aza - pentane - 1,5 - diammonium - dibromide of the formula

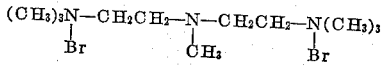

KARL MIESCHER.
ADRIAN MARXER.

References Cited in the file of this patent

UNITED STATES PATENTS

| Number | Name | Date |
|---|---|---|
| 2,040,061 | Munz et al. | May 5, 1936 |
| 2,101,524 | Balle et al. | Dec. 7, 1937 |
| 2,104,092 | Munz et al. | Jan. 4, 1938 |
| 2,113,606 | Taub et al. | Apr. 12, 1938 |

FOREIGN PATENTS

| Number | Country | Date |
|---|---|---|
| 700,008 | Germany | Dec. 11, 1940 |
| 112,354 | Sweden | Nov. 14, 1944 |

OTHER REFERENCES

Fruton et al.: "J. Organic Chemistry," vol. 11 (1946), pp. 571 to 580.